United States Patent [19]

Yamakawa et al.

[11] Patent Number: 5,420,810
[45] Date of Patent: May 30, 1995

[54] ADAPTIVE INPUT/OUTPUT APPARATUS USING SELECTED SAMPLE DATA ACCORDING TO EVALUATION QUANTITY

[75] Inventors: Hiroshi Yamakawa; Daiki Masumoto; Takashi Kimoto; Shigemi Nagata, all of Kawasaki, Japan

[73] Assignee: Fujitsu Limited, Kawasaki, Japan

[21] Appl. No.: 118,745

[22] Filed: Sep. 10, 1993

[30] Foreign Application Priority Data

Dec. 11, 1992 [JP] Japan .................................. 4-332080

[51] Int. Cl.⁶ ............................................ G06F 15/31
[52] U.S. Cl. .................................. 364/724.19; 395/23; 341/122
[58] Field of Search .................... 364/724.19; 395/23, 395/22; 341/51, 122, 124, 125

[56] References Cited

U.S. PATENT DOCUMENTS

| | | | |
|---|---|---|---|
| 3,652,839 | 3/1972 | Maekawa et al. | 235/152 |
| 3,789,203 | 1/1974 | Catherall et al. | 235/152 |
| 4,158,887 | 6/1979 | Kosugi | 364/723 |
| 4,853,885 | 8/1989 | Naoi et al. | 364/718 |
| 4,879,558 | 11/1989 | Swanson | 341/51 |
| 5,184,218 | 2/1993 | Gerdes | 358/133 |

FOREIGN PATENT DOCUMENTS

| | | |
|---|---|---|
| 0233071 | 8/1987 | European Pat. Off. |
| 0462815 | 12/1991 | European Pat. Off. |
| WO89/10596 | 11/1989 | WIPO |
| WO92/21102 | 11/1992 | WIPO |

*Primary Examiner*—Emanuel T. Voeltz
*Assistant Examiner*—Craig Steven Miller
*Attorney, Agent, or Firm*—Staas & Halsey

[57] ABSTRACT

The adaptive input-output apparatus comprises a data holding portion which holds sample data for determining an input/output function, a data selector which uses a predetermined evaluation standard to select valid sample data from said sample data, and an input/output portion which determines an input/output function in accordance with sample data selected by the data selector and outputs on the basis of the input/output function and in accordance with external input. Accordingly, the adaptive input-output apparatus removes unnecessary sample data or uses a predetermined condition to remove sample data having a small evaluation quantity and validity when the input/output function is determined, extracts sample data having a high validity and determines an input/output function using a reduced set of sample data.

12 Claims, 18 Drawing Sheets

F I G. 1 0
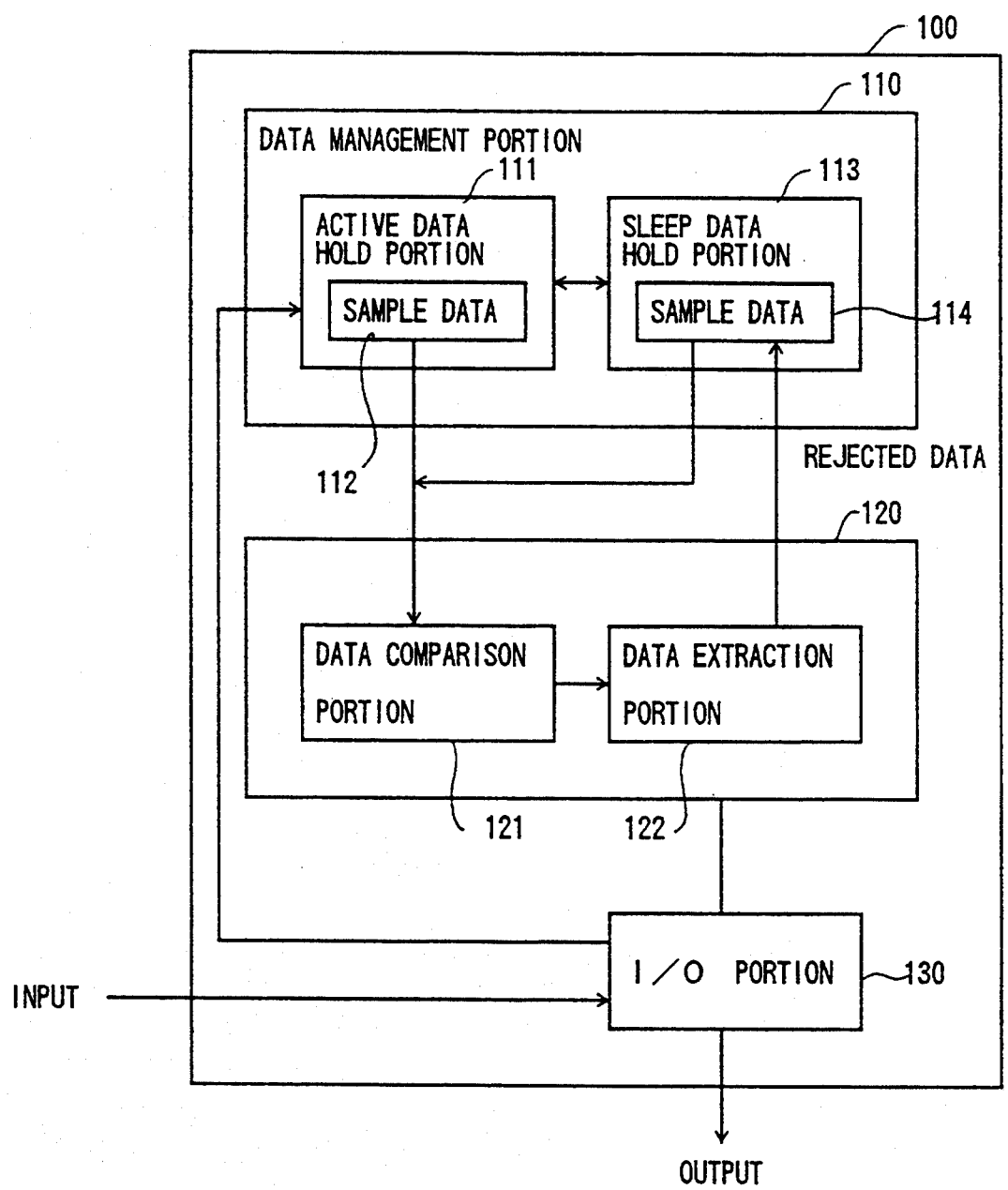

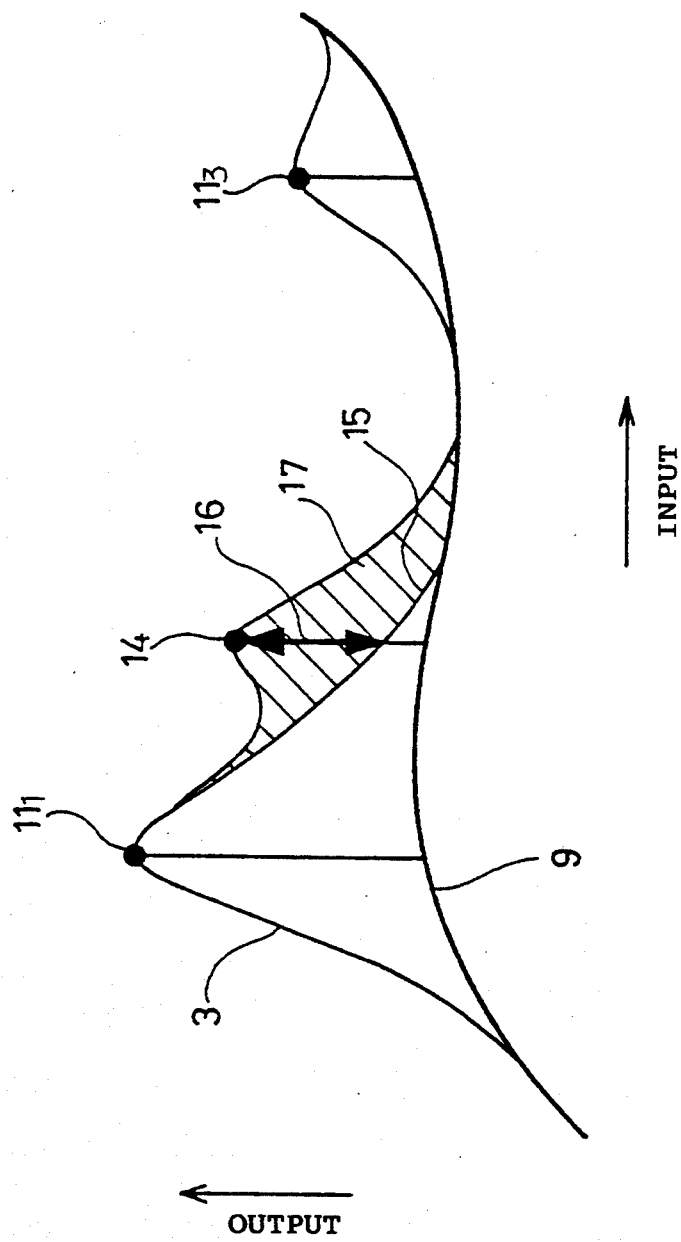

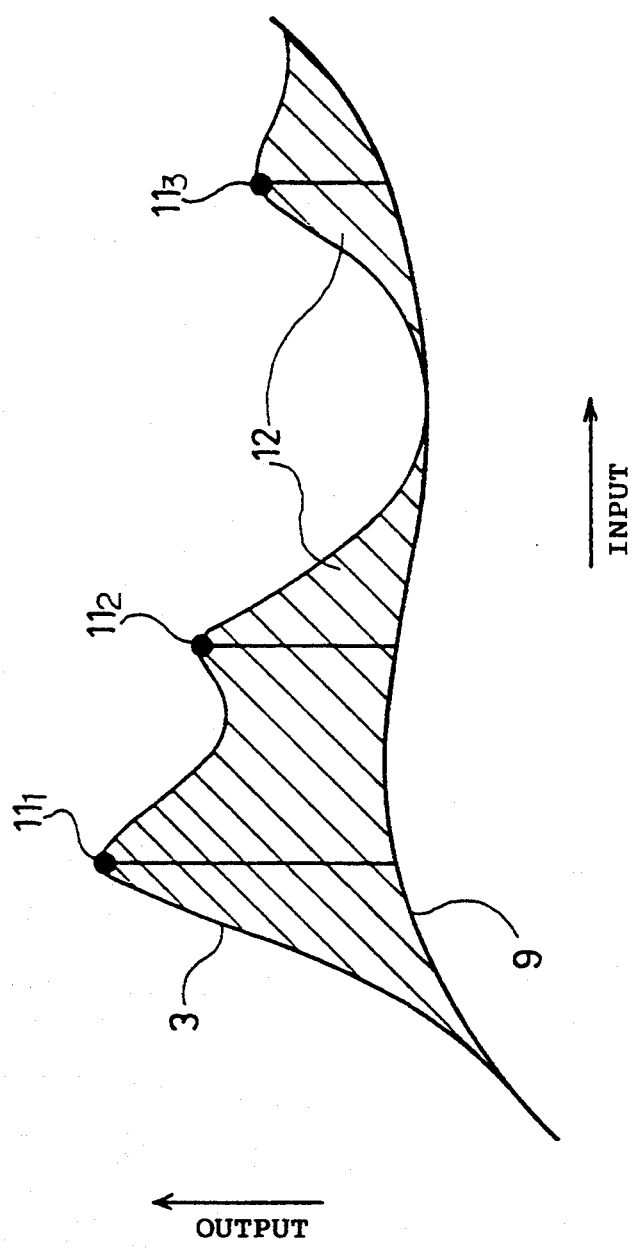

ADAPTIVE INPUT/OUTPUT APPARATUS USING SELECTED SAMPLE DATA ACCORDING TO EVALUATION QUANTITY

BACKGROUND OF THE INVENTION

The present invention relates to an adaptive input-output apparatus and in particular, relates to an adaptive input-output apparatus which is used in recognition, prediction and motion control of robots and the like. More specifically, the present invention relates to an adaptive input-output apparatus. The adaptive input-output apparatus uses the Bayes method for minimizing the mean of functions for a probability distribution in parameter space, and the K approximation method for determining the closest element of the three-dimensional elements of the given elements, and neural network modeling which obtain optimum values by learning, future mapping and other methods when a problem to be solved is given.

Recently, it has become necessary to have apparatus and equipment provided with a flexible application performance across various fields of engineering. Thus, an adaptive input-output apparatus fills an important role as a technical element of such apparatus.

Prior art FIG. 1 shows the constitution of a conventional adaptive input-output apparatus. The adaptive input-output apparatus 211 shown in the figure is comprised of the input/output portion 214 for the determination of the input/output function 213 which is determined from the sample data 216, and a data management portion 215 which holds and manages the sample data 216.

The sample data 216 of the data management portion 215 is expressed as pairs of input and output values ($x_i$, $y_i$) (where i=1,2, ... n) in accordance with the truth function which describes a desirable input-output relationship. The input/output portion 215 refers to the sample data ($x_i$, $y_i$) and determines the input-output function $f_N(x)$.

For example, when a neural network is used in the input in the input/output portion 214, the sample data 216 is used as learning data. A input/output portion 214 which uses a neural network learns so that the output error $e_1$ is minimized by the learning and approximates the truth function. Accordingly, the input/output portion supplements the input 212 which does not exist in the sample data 216. Also, it is possible for the output 218 of the adaptive input-output apparatus 211 to provide prompt responses with respect to the input 212.

Prior art FIG. 2 shows details of a conventional adaptive input-output apparatus.

The data management portion 215 has a data holding portion 219 for storing the sample data 216, and when this example is realized by a neural network, the sample data 216 ($P_i = x_i$, $y_i$) for learning is taken from the data holding portion 219 and applied at a predetermined timing to the input/output portion 214 in FIG. 1.

The input/output portion 214 uses the sample data 216 given from the data holding portion 219, and determines the input/output function 213 ($f_N(x)$) so that the truth function $f_{true}(x_i)$ is approximated.

FIG. 2A shows the case when there is a small quantity of sample data 216 in the data holding portion 219. In this case, when there is a small quantity of sample data 216, the accuracy of the output 218 deteriorates since the input/output function 213 does not sufficiently approximate the truth function "b". FIG. 2B shows the case when there is a large quantity of sample data 216 in the data holding portion 219. As shown in FIG. 2A, the truth function is not approximated when there is a small quantity of sample data 216 of the data holding portion 219, but as shown in FIG. 2B, there is interpolation of the sample data which does not exist in FIG. 2A when there is an increase in the quantity of sample data 216 so that the input/output function 213 sufficiently approximates the truth function "b" and the accuracy of the output 218 improves as a result.

However, as shown in FIG. 2A, a conventional adaptive input-output apparatus has a rough input/output function 213 when there is a small quantity of sample data 216 and fine sample data are not determined, hence making it difficult to obtain a input/output function 213 of a shape which approaches the truth function "b". As shown in FIG. 2B, when there is an increase in the quantity of sample data 216, there is the supply of sample data 216 which includes fine values and it is possible to obtain a input/output function 213 which is in agreement with the truth function "b". However, when learning using many sample data 216 is performed, there are the problems of an increase in the amount of processing and a resultant increase in the accompanying processing cost.

SUMMARY OF THE INVENTION

Accordingly, a general object of the present invention is to provide an novel and an effective adaptive input-output apparatus which solves the problems described above.

A more specific object of the present invention is to provide an adaptive input-output apparatus which uses sample data to select points having large evaluation quantities (large feature of sample data) so that it becomes possible to increase the accuracy of output even for small quantity of sample data.

These objectives can be attained by an adaptive input-output apparatus comprising a data holding portion which holds sample data for determining an input/output function, a data selector which uses a predetermined evaluation standard to select valid sample data from said sample data, and an input/output portion which determines an input/output function in accordance with sample data selected by the data selector and outputs on the basis of said input/output function and in accordance with external input.

More, the object of the present invention is achieved by an adaptive input-output apparatus using a neural network which uses selected sample data as teaching data.

Futhermore, the specific object of the present invention is the removal from the sleep data holding portion of the data holding portion, of data of the sample data held in sleep data holding portion and which exceeds a predetermined time and/or has a low evaluation.

Futhermore specific object of the present invention is achieved by an adaptive input-output apparatus which comprises a data selection and holding portion which holds valid sample data selected by the data selector, and a corrective input/output portion which corrects a change difference for the output of arbitrary sample data and output of an input/output function when that sample data is ignored, and an adder which adds an output from an input/output portion, and corrected output of a corrective input/output portion.

BRIEF DESCRIPTION OF THE DRAWINGS

FIG. 10 is a view for describing an adaptive input/output apparatus of the first embodiment according to the present invention;

FIG. 17 is a second view showing the evaluation of sample data when the data selector portion of the present invention is applied to adaptive input-output apparatus;

FIG. 18 is a view showing the results of addition of the corrected output and the main output of an adaptive input-output apparatus using the data selector portion of the present invention.

DESCRIPTION OF THE PREFERRED EMBODIMENTS

The following is a detailed description of preferred embodiments of the present invention, with reference to the appended drawings.

Figure 1:
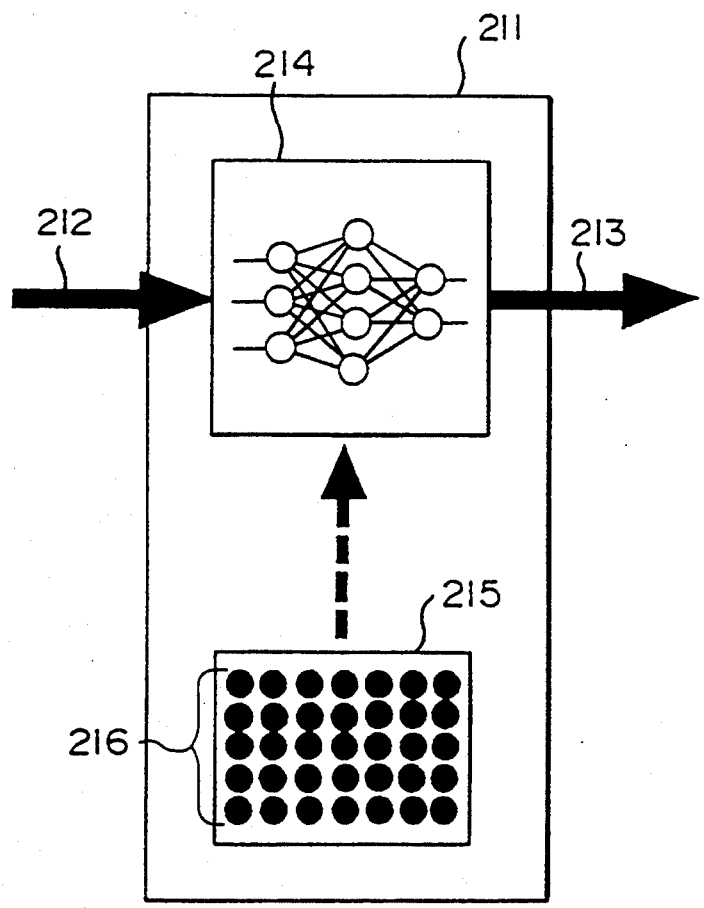
FIG. 1 is a schematic of a conventional (prior art) adaptive input-output apparatus.
Figure 2A:
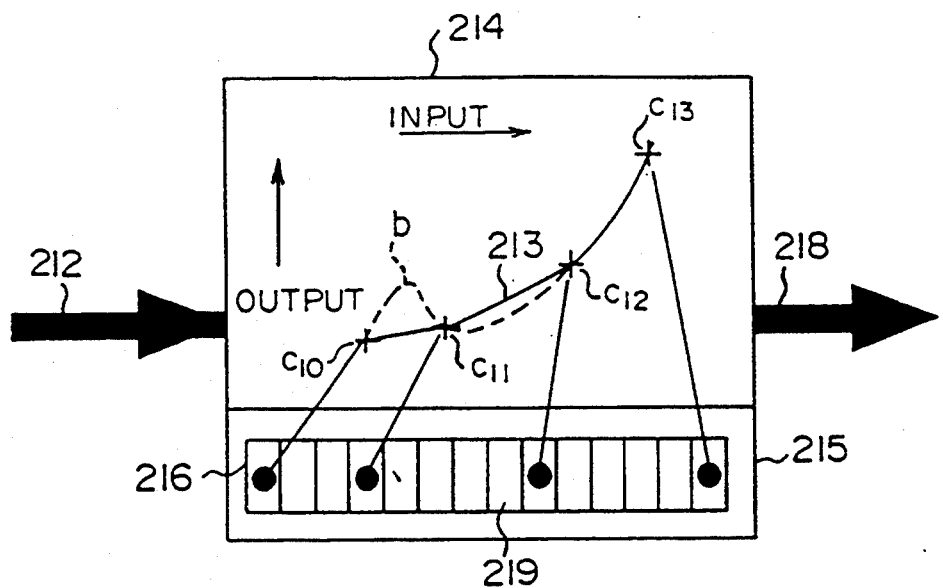
FIGS. 2A and 2B are views showing details of a conventional (prior art) adaptive input-output apparatus.
Figure 2B:
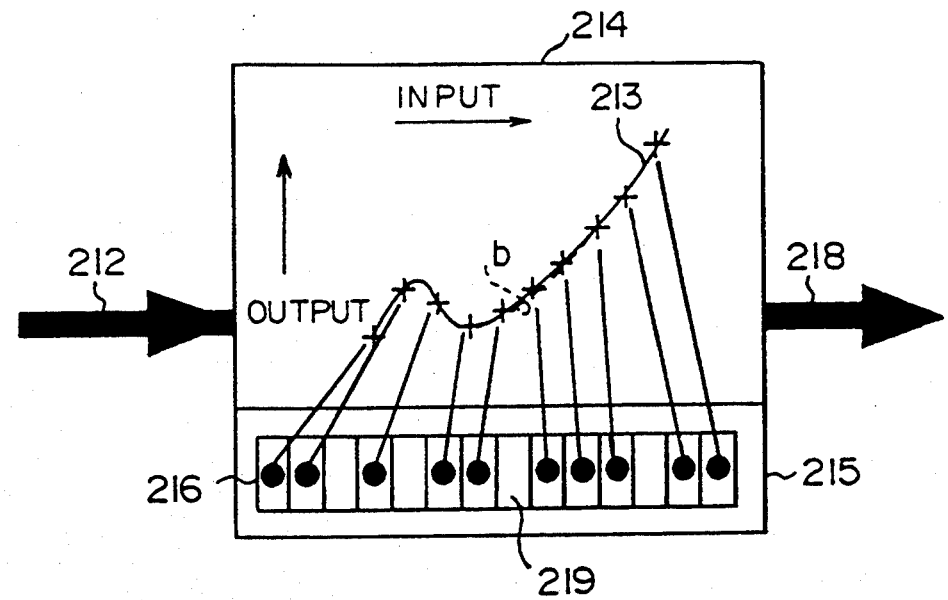
Figure 3:
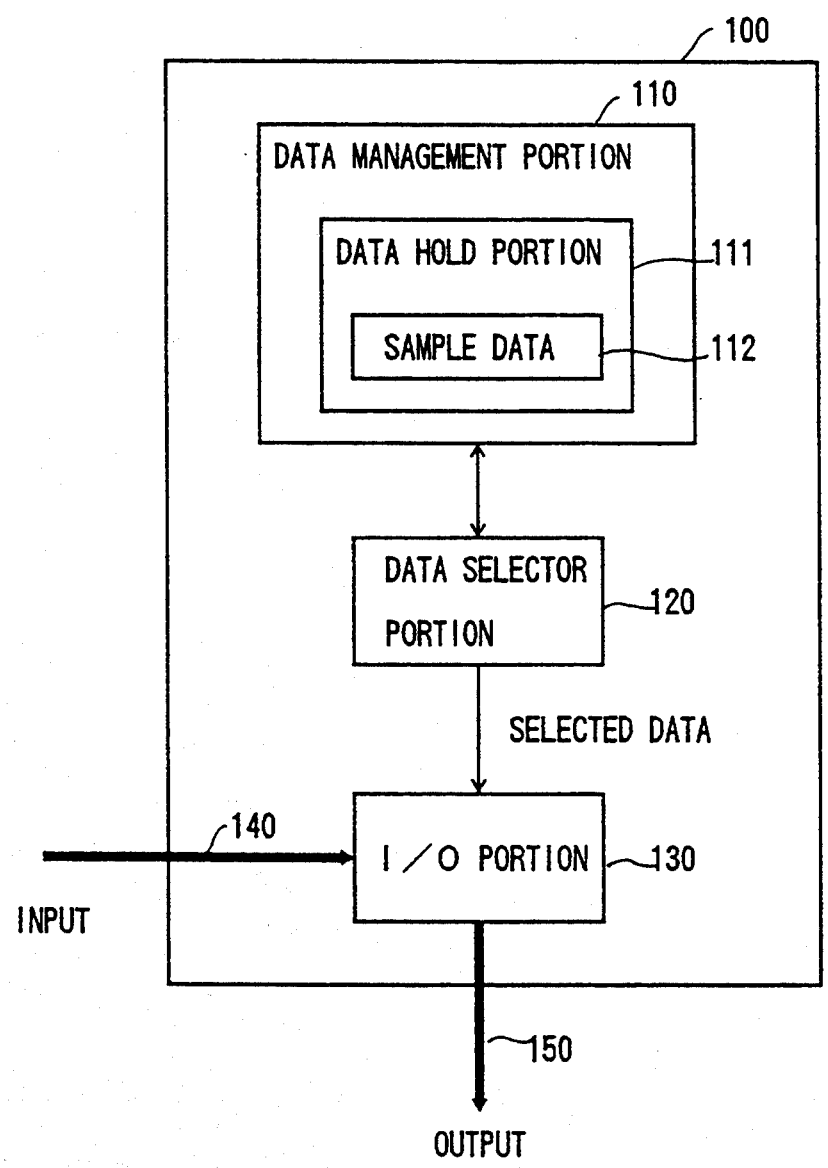
FIG. 3 is a view showing the constitution of an adaptive input-output apparatus according to the present invention.

FIG. 3 is a view showing the constitution of the present invention. An adaptive input-output apparatus 100 is comprised from a data holding portion 111 which holds a plural quantity of sample data 112, a data management portion 110 which manages the data holding portion 111, a data selector portion 120 for selecting the valid data on the basis of the sample data 112 so that the input/output function sufficiently approximates the truth function, and an input/output portion 130 which uses the sample data 112 selected by the external input 140 and the data selector portion 120 to output the input/output function.

Figure 4A:
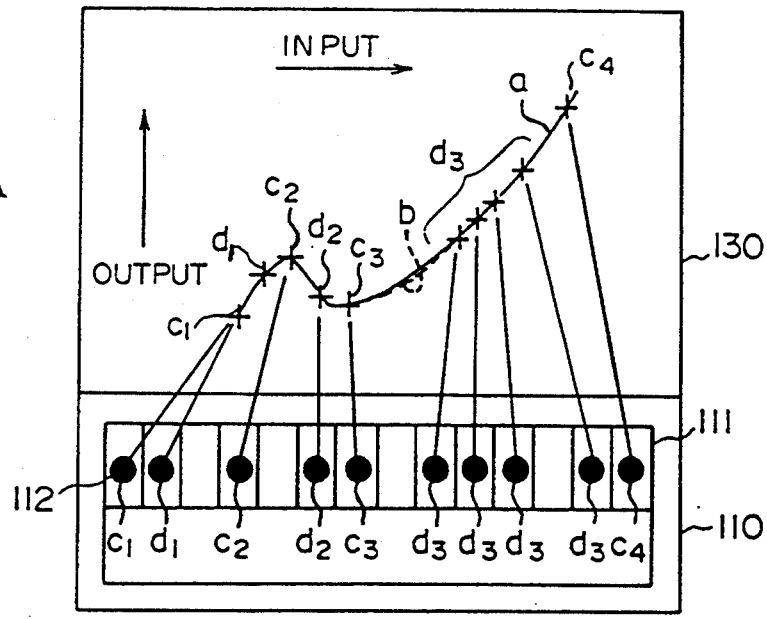
FIGS. 4A and 4B are views for describing the concept according to the present invention.
Figure 4B:
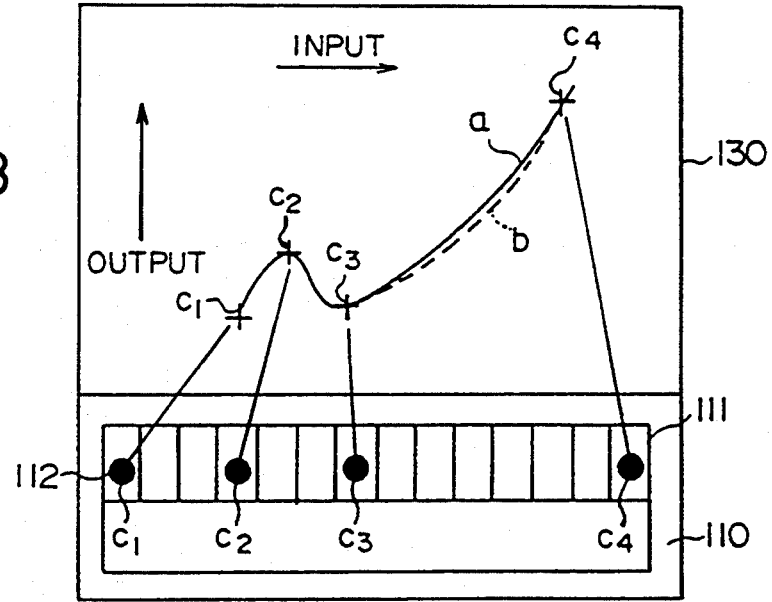

FIG. 4A and FIG. 4B show the concept of an embodiment according to the present invention. In FIG. 4A and FIG. 4B, the input and output portion 130 and the data management portion 110 are shown in order to facilitate understanding. In FIG. 4A and FIG. 4B, those portions which have the same constitution as that shown in FIG. 3 are indicated with the same reference numerals.

FIG. 4A shows the status prior to data selection, and FIG. 4B corresponds to only the valid sample data from the data selector portion 120.

FIG. 4A shown the status prior to data selection, and FIG. 4B corresponds to only the valid sample data from the data selector portion 120. In FIG. 4B, "a" is an input/output function "$f_N$", "b" is a truth function "$f_{true}(x_i)$", "c" is valid sample data $(x_i, y_i)$ (i=1, 2, ..., N) for which the evaluation quantity is large, and "d" is invalid sample data for which the evaluation quantity is small.

In this embodiment, only the valid sample data remains from the 10 sample data, and the invalid sample data which has a low evaluation is discarded. As can be seen from FIG. 4A, the data which is invalidated is data which has a small evaluation quantity when compared with the valid sample data "c". For example, when the valid sample data $c_1$, $c_2$, $c_3$, $c_4$ are compared with the invalid sample data $d_1$, $d_2$, $d_3$, it is possible to obtain an input/output function "a" without there being any sample data $d_1$, $d_2$, $d_3$ as long as there are valid sample data $c_1$, $c_2$, $c_3$, $c_4$. In addition, the input/output function "a" must be function which approximates the truth function "b" and so in the input/output portion 130, the performance of learning using the sample data $(x_i1, y_i)$ as the learning data obtains the input/output function "a=$f_N(x)$".

The following is a description of the method of selecting the valid sample data "c" using the data selector portion 120 and as shown in FIG. 4B.

Figure 5:
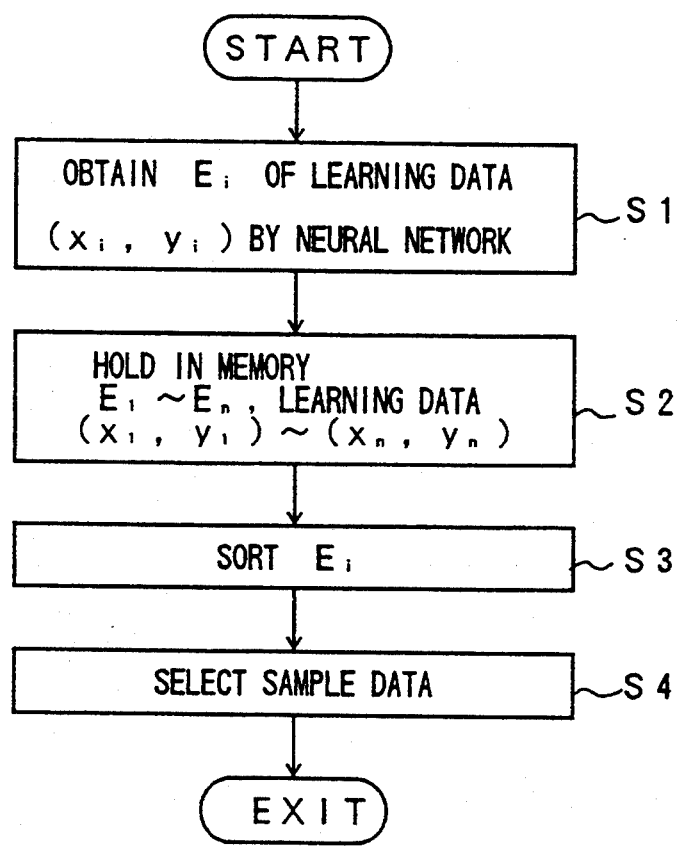
FIG. 5 is a flow chart of a process executed for using the output-error of the neural network for the first embodiment according to the present invention.

FIG. 5 is a flowchart for showing the procedure for selection of the sample data using the output error of a neural network of the sample data selector portion of the first embodiment according to the present invention.

Step 1) The data selector portion 120 determines the squared error "$e_i^2$" with respect to the output of the sample data $(x_i, y_i)$ (where i=1, 2, ..., N) for the output of the neural network.

$$E_i = |y_i - f(x_i)|^2$$

Step 2) Once the errors $e_1 \sim e_n$ relating to all of the sample data $(x_i, y_i) \sim (x_n, y_n)$ have been determined by the data selector portion 120, the data selector portion 120 stores the errors in the memory and so that they correspond to all of the sample data.

Step 3) The data selector portion 120 makes the errors "$e_i$" correspond with the sample data and sorts them into descending order.

for $(i=n, n \geq 1)$ if $(e_{i-1} > e_i)$ swap $(e_{i-1}, e_i)$

Step 4) The data selector portion 120 selects sample data. Here, if there is the condition of "sample data other than five sample data having the largest values for the error $E_i$ are removed," then only the sample data having the four largest values remain in the data selector portion 120. The input/output portion 130 learns using sample data in the neural network.

Figure 6:
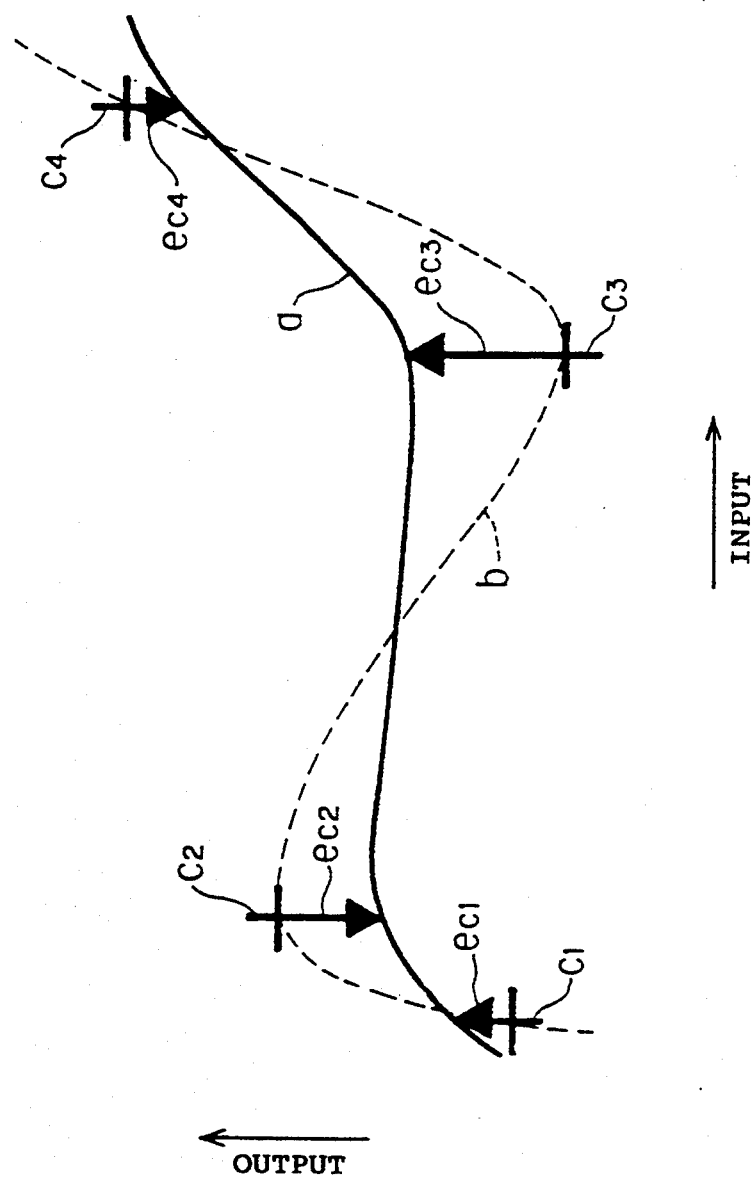
FIG. 6 is a view for describing the evaluation of the sample data using the error of the data selector portion of the first embodiment according to the present invention.

FIG. 6 is a view describing the results of evaluation of the sample data using the error of the data selector portion 120 of the first embodiment according to the present invention. As shown in FIG. 6, the data selector 120 selects or rejects so that there can be enough learning to sufficiently approximate the truth function even if the quantity of sample data is reduced. Accordingly, the input/output portion 130 uses the neural network, the adaptive input/output apparatus enables the calculation time predetermined for learning to be reduced without much loss to the accuracy of output. Moreover, applying this to the input/output portion 130 has a similar effect if another Bayes method, a K-approximation method, future mapping or LVQ is used.

In the first embodiment described above, the error was used as the reference for selection of the sample data but with this reference if the error "$e_i$" of the input/output function "$f_N(x)$" and the sample data 112 is large, it is necessary to have much correction of the output in the input/output portion 130 to give a high utility, but when there is no error between the sample data 112 and the input/output function, the output ($y_i$) of the sample data and the input/output function $f_N(x)$ are in agreement and the squared error becomes zero. It is not possible for this value to be used as reference for evaluation and so the following description of a second embodiment uses a method to eliminate this deficiency.

Figure 7:
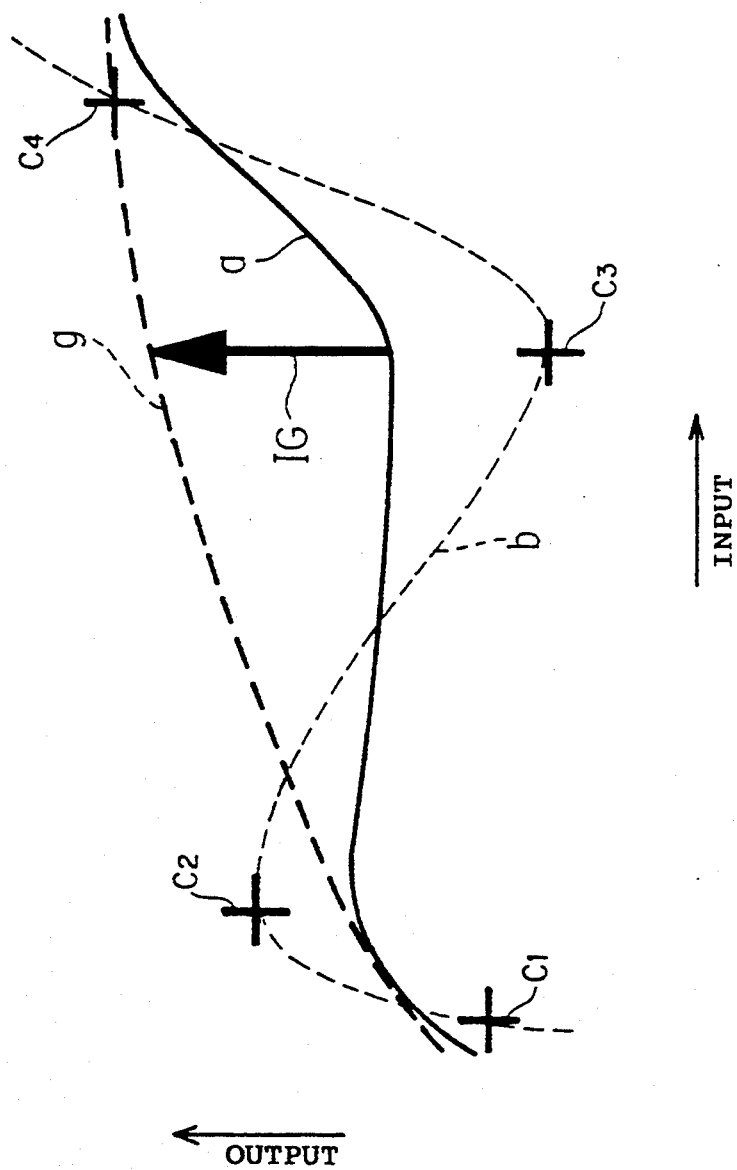
FIG. 7 is a view describing the sample data selection of the data selector portion of a second embodiment according to the present invention.

FIG. 7 is a view describing the sample data selection of the data selector portion of a second embodiment according to the present invention. In FIG. 7, those portions which correspond to portions of FIG. 6 are shown with corresponding numerals.

In FIG. 7, when the sample data "$c_3$" is ignored, the input/output function "a" becomes the changed input/output function "g". The difference quantity IG of the input/output function which is the error between input/output function "a" for the changed sample data "$c_3$" and the changed input/output function "g", can be made the reference for evaluation. In this case, there is a high utility for the sample data for which the difference quantity IG is large.

When the sample data "$c_3$" is ignored, the squared error "$e_i^2$" is given by $$e_i^2 = |y_i - e(x_i; c_1, c_2, c_4)|^2$$

obtained when the output $f(x_i; c_1, c_2, c_4)$ and the output $y_i$ of the data is used as the reference for evaluation. The data become valid data with a larger difference quantity IG and a larger utility for the larger squared error "$e_i^2$".

Figure 8:
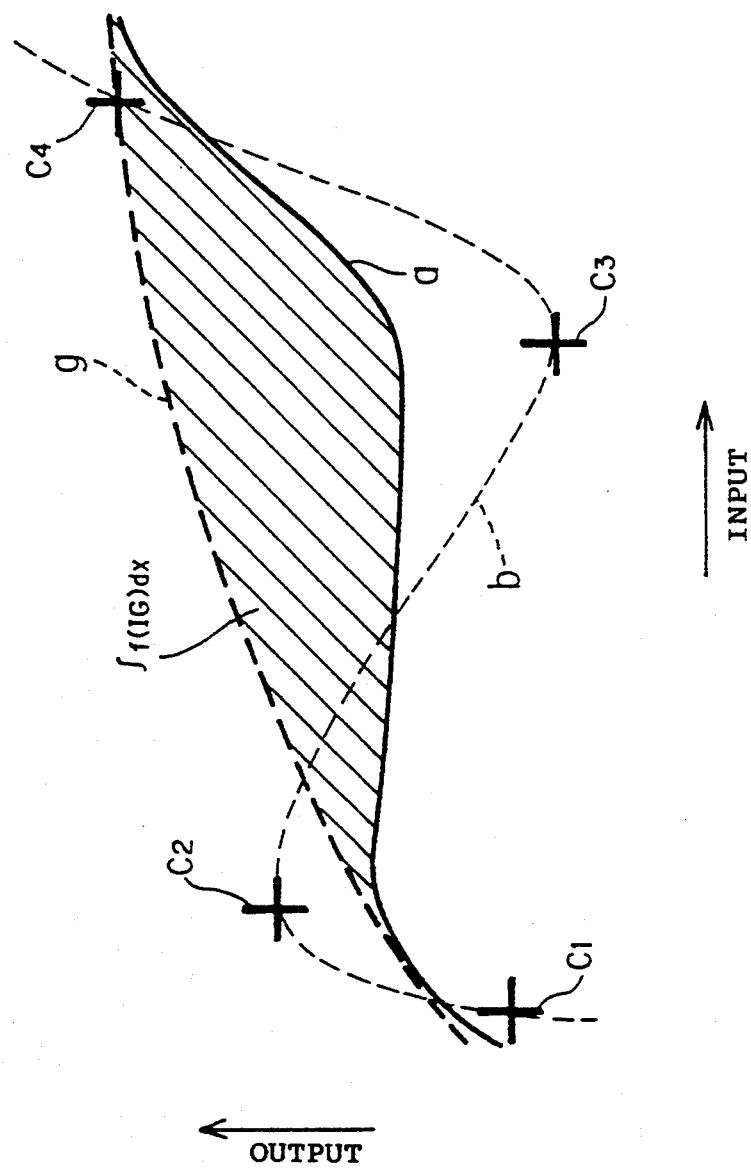
FIG. 8 is a view describing the sample data selection of the data selector portion of the third embodiment according to the present invention.

FIG. 8 is a view describing the sample data selector portion of the third embodiment according to the present invention. In FIG. 8, those portions which have the same constitution as that shown in FIG. 7 are indicated with the same reference numerals and the corresponding descriptions are omitted. This embodiment uses the equation $$\int f(IG)dx$$

to integrate the difference quantity IG when the sample data of the second embodiment is ignored and selects the sample data which has a large integration amount. In this case, the sample data "$c_3$" is the most valid data.

The evaluation standard calculated from the squared error "$e_i^2$" includes the evaluation standard from the distribution status. For example, when the sample data "$P_i$" exists in the proximity of the sample data "$P_j$", the squared error becomes smaller for the closer the sample data "$P_i$" is to the sample data "$P_j$". This is to say that if there is a concentration of sample data in the input portion for which the truth function "b" is smooth, the evaluation of the mutual sample data becomes lower.

Figure 9:
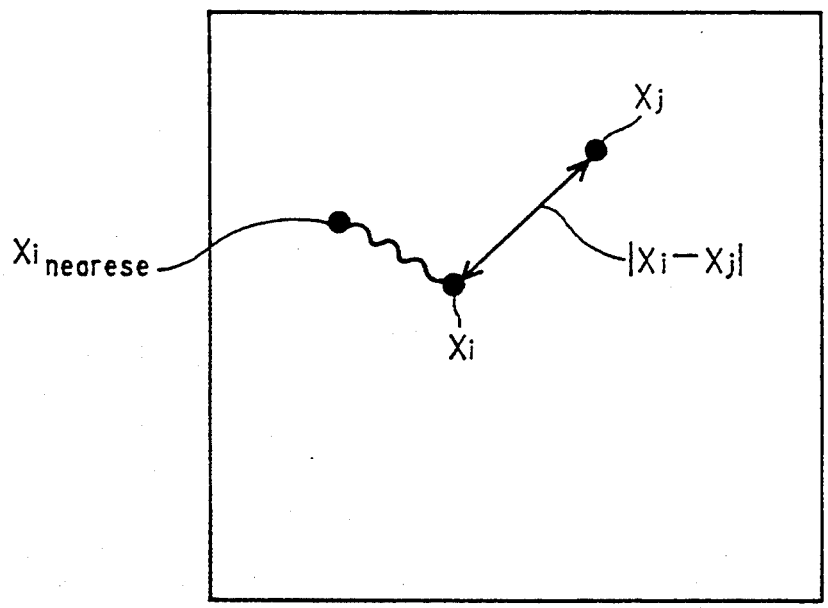
FIG. 9 is a view describing the selection of sample data for the case when the spatial relationship of the data selector portion of the fourth embodiment according to the present invention is used.

FIG. 9 is a view describing the selection of sample data for the case when the spatial relationship of the data selecting portion is used.

The distance inside the input space is the Euclidean distance $E_i$ calculated by the following equation.

$$E_i = |x_i - i_{nearest}| \quad (1)$$

or $$E_i = \sum_{j=1}^{n} |X_i - X_j| \quad (2)$$

In equation (2) above, the distance E selects below a pre-set value $\theta$.

Moreover, the evaluation at a time not mentioned in the embodiments described above, is used as $E_i(t)$ in the method below for determining the time average.

$$E(t) = \alpha E(t) + (1-\alpha)E(t-1)$$

Where $\alpha$ is $0 < \alpha < 1$.

The following is a description of the data holding portion 111 of the present invention. The data holding portion 111 holds the sample data which is to be selected by the data selector portion 120, and furthermore, holds the sample data which is invalid and which has been removed by the data selector portion 120. The following is a description for the status when successively new sample data from the data holding portion 111 which holds the sample data of the present invention is supplied to the data selector portion 120.

FIG. 10 is a view describing the adaptive input/output apparatus of the first embodiment according to the present invention.

In addition to the data holding portion 111 of the data management portion 110 of the constitution shown in FIG. 3, the constitution shown in FIG. 10 is provided with a sleep data holding portion 113. In the present embodiment, the data management portion 110 is comprised from the active data holding portion 111 and the sleep data holding portion 113. The active data holding portion 111 has some active sample data 112. The sleep data holding portion 113 has some sleep sample data 114.

The data comparison portion 121 of data selector portion 120 compares the active sample data 112 from the active data holding portion 111.

The data extraction portion 122 removes needless data according to the predetermined valuation standard.

The processing of the present invention supplies the sample data 112 from the active data holding portion 111 to the data comparison portion 121 of the data selector portion 120. However, with the constitution of the data management portion 110 shown in FIG. 4A and FIG. 4B, the sample data 112 is supplied to the data selector portion 120 and sample data which is not valid is removed but there are instances where the removed data becomes necessary later. In order to ameliorate this deficiency, the present embodiment has the data management portion 110 provided with a sleep data holding portion 113.

Figure 11:
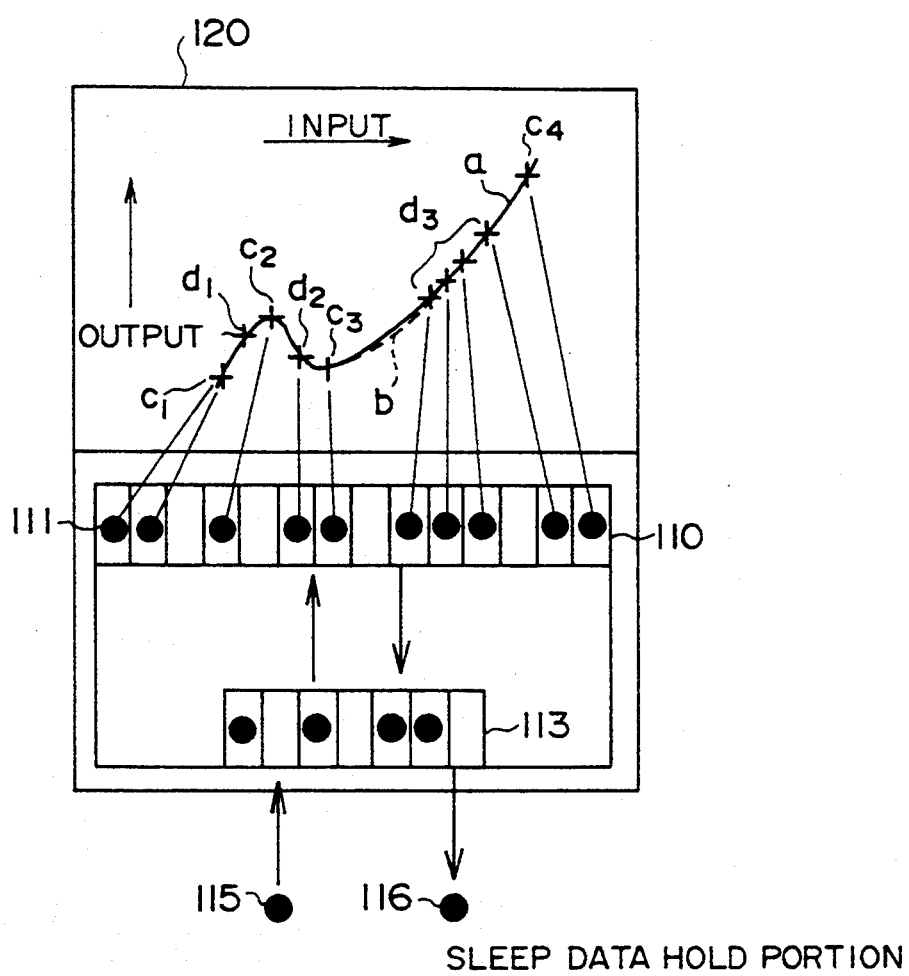
FIG. 11 is a view showing details of the data selector portion of the first embodiment according to the present invention.

FIG. 11 is a detailed view describing a data holding portion.

In FIG. 11 the sample data from the active data holding portion 111 is supplied to the data selector portion 120. The data comparison portion 121 of the data selector portion 120 compares each of the sample data and when the data $d_1$, $d_2$, $d_3$ which is not valid is removed so that the valid data $c_1$, $c_2$, $c_3$, $c_4$ remain, that data $d_1$, $d_2$, $d_3$ is transferred to the sleep data holding portion 113. The sample data transferred from the data selector portion 120 is held in the sleep data holding portion 113 for a predetermined period of time.

Figure 12:
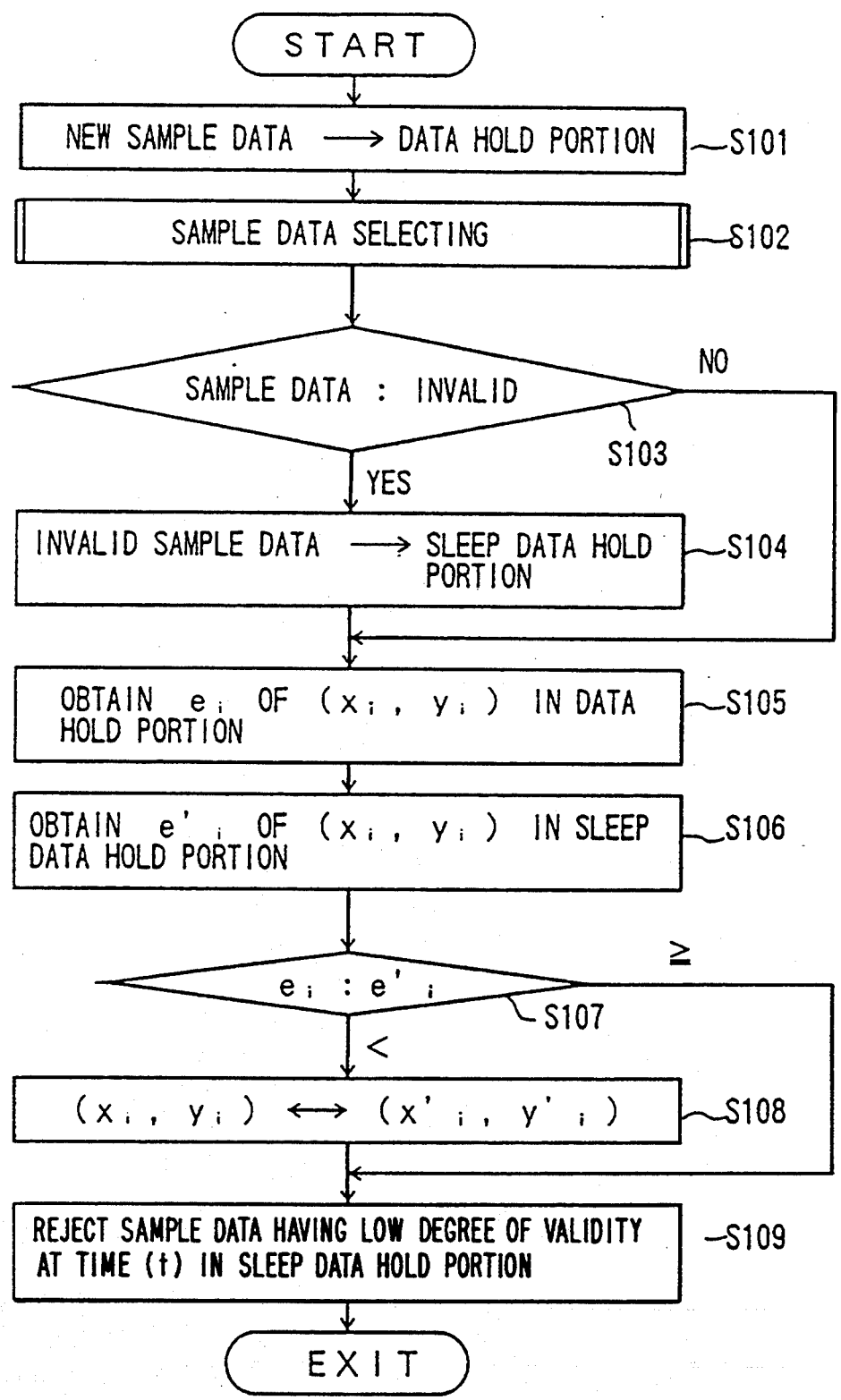
FIG. 12 is a flowchart showing the processing for the case when there is a limit to the quantity of data which can be held in the sleep data holding portion and active data holding portion of the data management portion in a second embodiment according to the present invention.

FIG. 12 is a flowchart showing the operation of a first embodiment of the data management portion of the present invention.

Step 101) The new sample data which has been successively supplied, is added to the sleep data holding portion 113 by the data management portion 110.

Step 102) The data selector portion 120, performs processing for the selection of the sample data having a large evaluation quantity for validity.

Step 103) In step 102, the data management portion 110 judges whether there are sample data which have become invalid in the active data holding portion 111, and this process goes to step 105 if there are not. On the other hand, if there are sample data which have become invalid, then, this process goes to next step.

Step 104) The sample data which has become invalid in the active data holding portion 111, is added to and registered in the sleep data holding portion 113 by the data selector portion 120.

Step 105) The data management portion 110 determines the error "$\Delta e_i$" for the sample data ($x_i$, $y_i$) inside the active data holding portion 111. A predetermined evaluation standard is used to determine the error of one or a plural number of active data in descending order.

Step 106) The data management portion 110 determines the error $e'_i$ in the same manner as in step 105, for the sample data ($x'_i$, $y'_i$) which has become invalid and which is in the active data holding portion 111. A predetermined evaluation standard is used to determine the error of one or a plural number of sample data in a descending order.

Step 107) The data management portion 110 compares the error "$\Delta e_i$" of one or plural number of sample data ($x_i$, $y_i$) inside the active data holding portion 111, and the error "$e'_i$" for the same number of sample data of the active data holding portion 111, and this process goes to step 109 when there is high degree of validity for the sample data of the active data holding portion 111. On the other hand, this process goes to the next step when there is a high degree of validity for the sample data of the sleep data holding portion 113.

Step 108) The sample data which has become active data in the sleep data holding portion 113 and the sample data of the active data holding portion 111 are then swapped.

Step 109) When a certain period of time (t) has elapsed, the degree of validity of the sample data in the sleep data holding portion 113 is low and so sample data which is not used is removed in ascending order of validity.

As has been described above, the use of the sleep data holding portion 113 means that only a small quantity of valid sample data is discarded by the data selector portion 120 and so it is possible to hold more suitable sample data inside the active data holding portion 111. Thus, it is possible for the input/output function to approach the truth function.

Moreover, in the flowchart described above, if the new data is added to the sleep data holding portion 113 and there is a high validity in step 108, the new data is transferred to the active data holding portion 111 but it can be added to the active data holding portion 111.

The following is a description of the case when there is a limit to the data which can be held in the active data holding portion 111 and the sleep data holding portion 113.

The active data holding portion 111 has the set $A=(P_1, P_2, \ldots P_M)$ for the largest M quantity of sample data $P_i$ (where $i=1 \sim M$), and the sleep data holding portion 113 holds the set $S=(Q_1, Q_2, \ldots, Q_N)$ for the largest N quantity of data $Q_i$ (where $i=1 \sim N$). The active data holding portion 111 deletes unnecessary data while successively taking in new data and so the data set A selects and holds the active data for which learning for the neural network and correction of the output can be validly performed and so uses the data set S of the sleep data holding portion 113.

Figure 13:
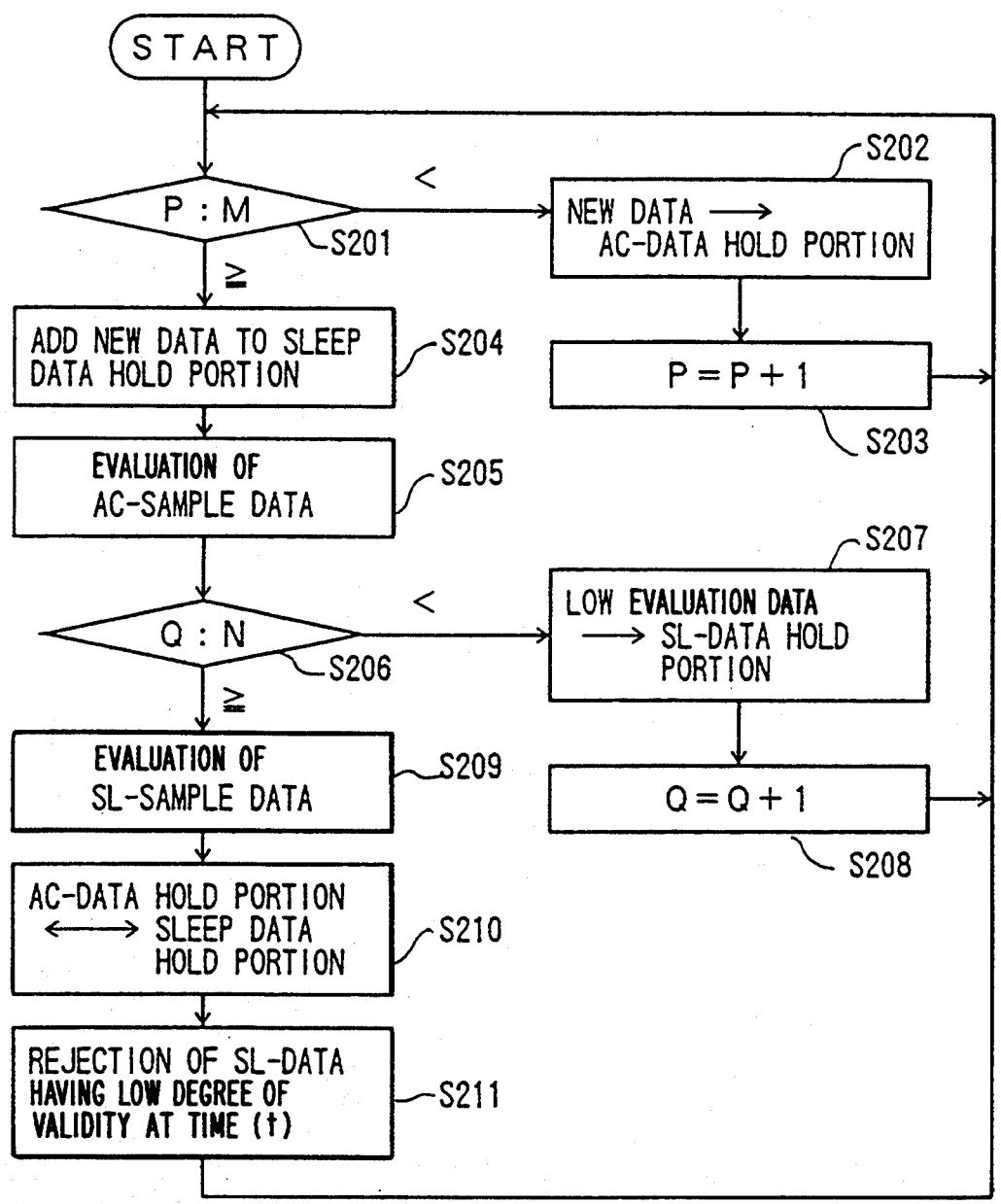
FIG. 13 is a flowchart for the case when there is a limit to the quantity of data held in the sleep data holding portion and the active data holding portion of the data selector portion of the second embodiment according to the present invention.

FIG. 13 is a flowchart shown the processing for the case when there is a limit to the quantity of data which can be held in the sleep data holding portion and the active data holding portion of the data management portion in a second embodiment according to the present invention.

Step 201) The active data holding portion 111 holds the quantity of data inside the data set $A=(P_1, P_2, \ldots P_M)$ to the quantity M or less and so that data having a large evaluation for the squared error "$e_i^2$" remains. Here, the active data holding portion 111 receives from the sleep data holding portion 113 the sample data which has become sleep data and there go to step 204 if the quantity P of the data in the active data holding portion 111 is M or more ($P \geq M$), this process goes to step 202 if the quantity P of the data in the active data holding portion 111 is less than M or more ($P < M$).

Step 202) The new data is added to the active data holding portion 111.

Step 203) The quantity of active data P is incremented and the process goes to step 201.

Step 204) When the quantity of data P in the active data holding portion 111 is greater than the quantity of data M in the sleep data holding portion 113, the new data is added to the sleep data holding portion 113.

Step 205) The squared error "$\Delta e_i^2$" of the sample data of the active data holding portion 111 is evaluated.

Step 206) Processing goes to step 207, if the quantity of data Q of the sleep data holding portion 113 is less than the maximum quantity of the sleep data holding portion 113 (Q<N), and processing goes to step 209 if the quantity of data Q of the sleep data holding portion 113 is greater than or equal to the maximum quantity of the sleep data holding portion 113 (Q≧N).

Step 207) The data of the evaluated sample data of the active data holding portion 111 which has a low validity is transferred to the sleep data holding portion 113.

Step 208) The quantity of data Q of the sleep data holding portion 113 is increased (Q=Q+1) and this process returns to step 201.

Step 209) If the quantity of data of the input/output portion 130 is equal to or greater than the maximum quantity N of the sleep data holding portion 113 (Q≧N), there is the evaluation of the squared difference "$e_i^2$" with respect to the sample data Q of the sleep data holding portion 113.

Step 210) Processing similar to that of step 108 of the flowchart of the previously described FIG. 12 is performed.

Step 211) Processing similar to that of step 109 of the flowchart of the previously described FIG. 12 is performed.

The following is a specific description of the relationship between the sleep data holding portion 113 and the active data holding portion 111 described above.

FIG. 14A, FIG. 14B, FIG. 14C and FIG. 14D show examples of the holding of sleep data and active data in a second embodiment of the data management portion according to the present invention. In FIG. 14A, FIG. 14B, FIG. 14C and FIG. 14D, the bar extending across each data shows the size of the error "$e_i^2$".

Figure 14A:
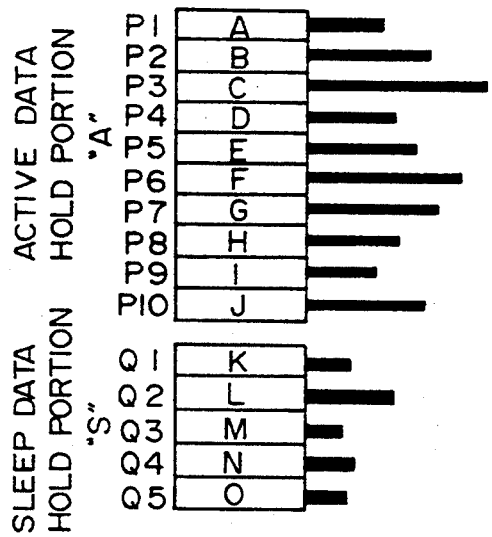
FIGS. 14A–14D are views showing a specific example of the sleep data and the active data of the data selector portion of the second embodiment according to the present invention.
Figure 14B:
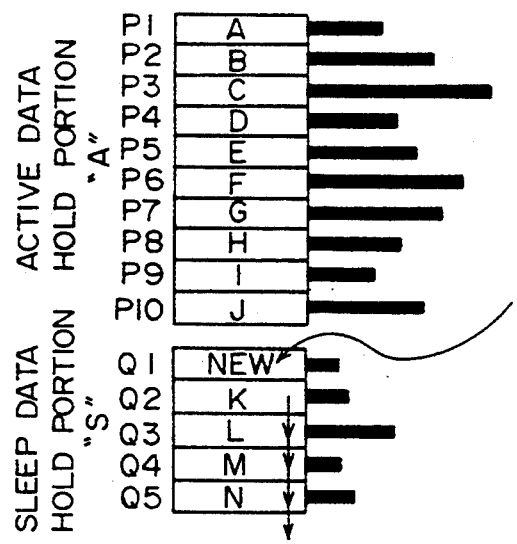
Figure 14C:
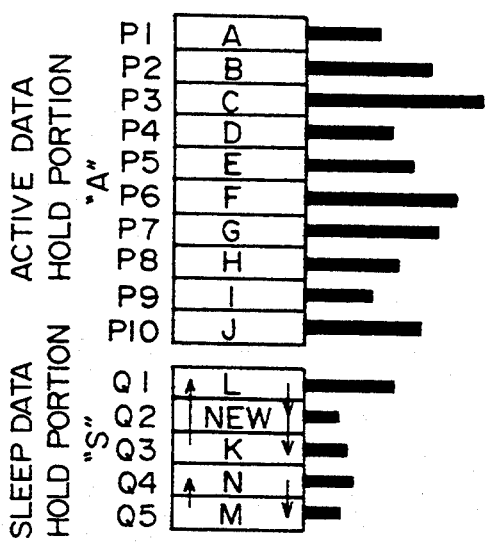
Figure 14D:
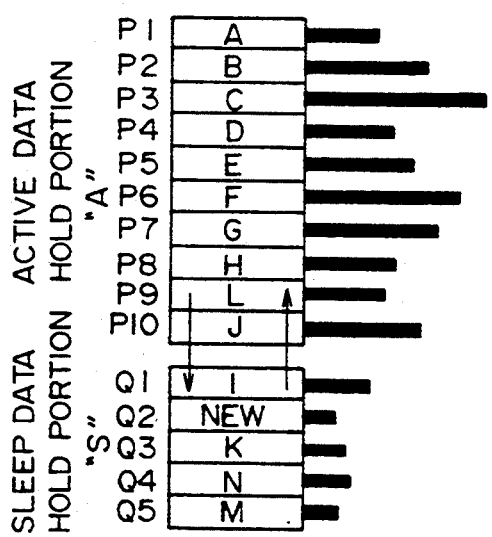

FIG. 14A shows the initial status, and the active data holding portion 111 stores for example, the ten data [A~J], while the sleep data holding portion 113 can store the 5 data [K~N]. FIG. 14B shows when the new data (New) is added to the highest position of the sleep data holding portion "S", and when the other data simultaneously dropped one position. In FIG. 14C, the data at the lowest position of the sleep data holding portion "S" and that data above it are compared and there is swapping if the data has a smaller error. This swapping is performed for each data in ascending order. FIG. 14D shows the comparison of the data [I] at the highest position of the sleep data holding portion "S" and the data [L] of the active data holding portion "A" and for which the error is smallest, and the swapping if the error of the sleep data holding portions "S" is large. In this case, [L>I] and there is no swapping.

As shown in FIG. 14A, FIG. 14B, FIG. 14C and FIG. 14D, the active data holding portion 111 holds data having the long bars as active data. The following is a description when there is sequential addition, with reference to FIG. 14A, FIG. 14B, FIG. 14C and FIG. 14D. In the initial status shown in FIG. 14A, the data A~data J are held in the active data holding portion A, and the data K~data N are held in the sleep data holding portion 113.

Here, as shown in FIG. 14B, when the sleep data holding portion [S] takes the new data (New), it is overlapped with the position Q1 which is at the highest position in the sleep data holding portion S, and the other data each dropped one position, and the data [O] which is at the lowest position Q5 is discarded.

Then, as shown in FIG. 14C, there is swapping inside the sleep data holding portion "S" in descending order. First, in FIG. 14B, the data [M] at position Q4 inside the sleep data holding portion "S" is compared with the data [N] at position Q5, and the data having the larger evaluation quantity is placed in position Q4. Then, the same operation is performed for the data at position Q3 and the data at position Q4. After the execution of similar operations for the successively higher data, the data having the highest evaluation quantity inside the sleep data holding portion (L, in the case of FIG. 14B) is placed at position Q1. Furthermore, as shown in FIG. 14D, the data [L] of the sample data and the data [I] of the active data holding portion "A" are swapped if they are larger than the data at the highest position Q1 of the sample data and the data [I] having the lowest evaluation inside the active data holding portion "A".

The following is a description of the case when the sample data selector portion and the data management portion described above are used in an adaptive input-output apparatus.

Figure 15:
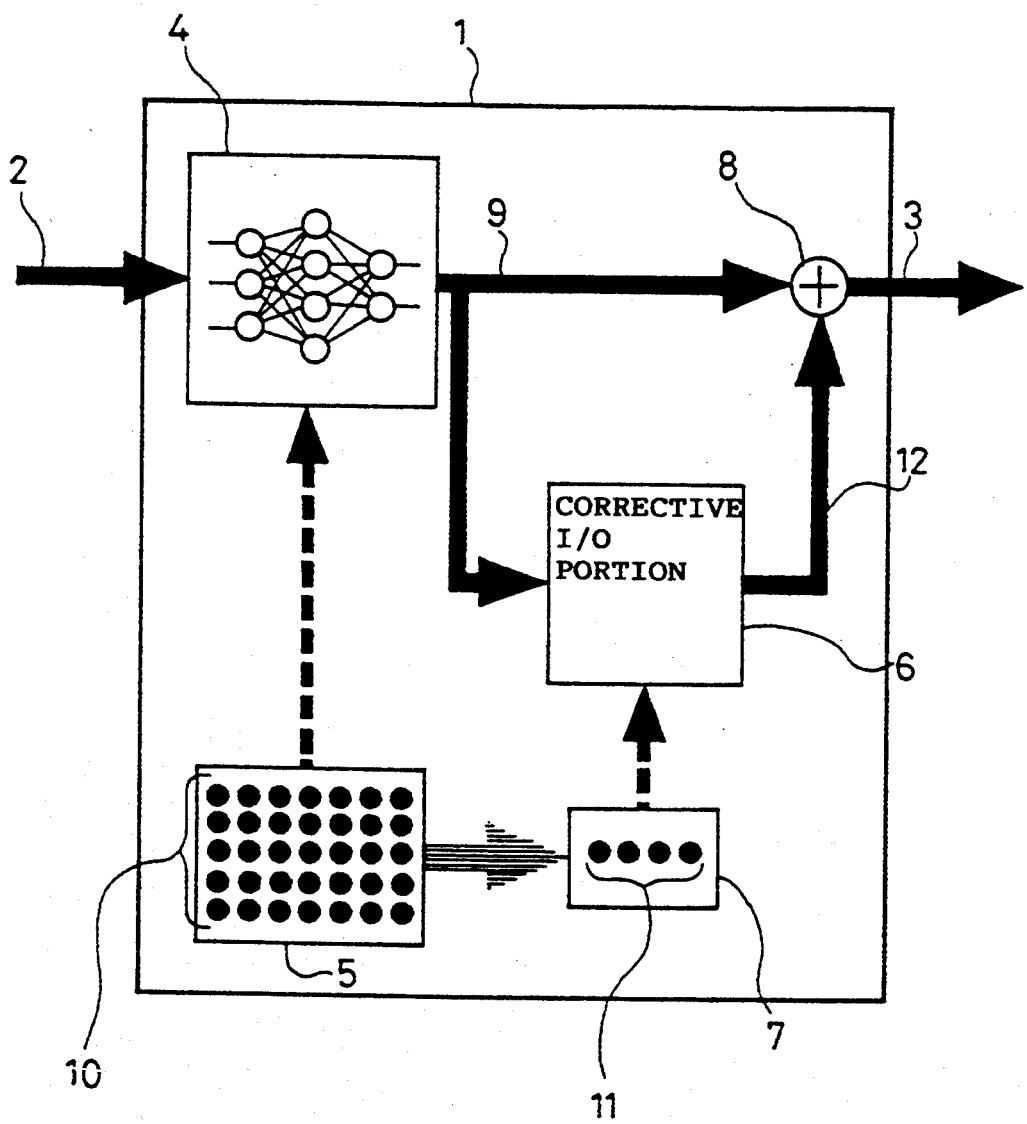
FIG. 15 is a view showing an example when the data selector portion and the data holding portion of the a present invention are applied to an adaptive input-output apparatus.

FIG. 15 is a view showing the sample data selector portion and the data management portion according to the present invention, used in an adaptive input-output apparatus.

The adaptive input-output apparatus 1 shown in FIG. 15 is comprised of a main input/output portion 4, a data holding portion 5, a corrective input/output portion 6, a data selecting and holding portion 7 and an adder 8.

The adaptive input-output apparatus 1 outputs the output 3 in accordance with the input 2 which has been received externally. The main input/output portion 4 performs applied input and output having a fast response such as for a neural network or the like. The data holding portion 5 has a function the same as that of the active data holding portion 111 of the data management portion 110. The data holding portion 5 stores the sample data which is referred to when the main input/output portion 4 determines the output 5 and is used as learning data (sample data) for the main input/output portion 4.

The data selecting and holding portion 7 must reduce the quantity of the sample data 11 which are referred to by the corrective input/output portion 6 in order for the amount of processing to be reduced to meet the response requirements of the corrective input/output portion 6. This is activated by either of the methods of the previously described embodiments of the data selector portion, and the sample data having a high utility is selected from the data holding portion 5 and held.

The corrective input/output portion 6 avoids neural network learning and uses the method of ignoring the sample data to generate the corrected output 12 which supplements the error "e".

Figure 16:
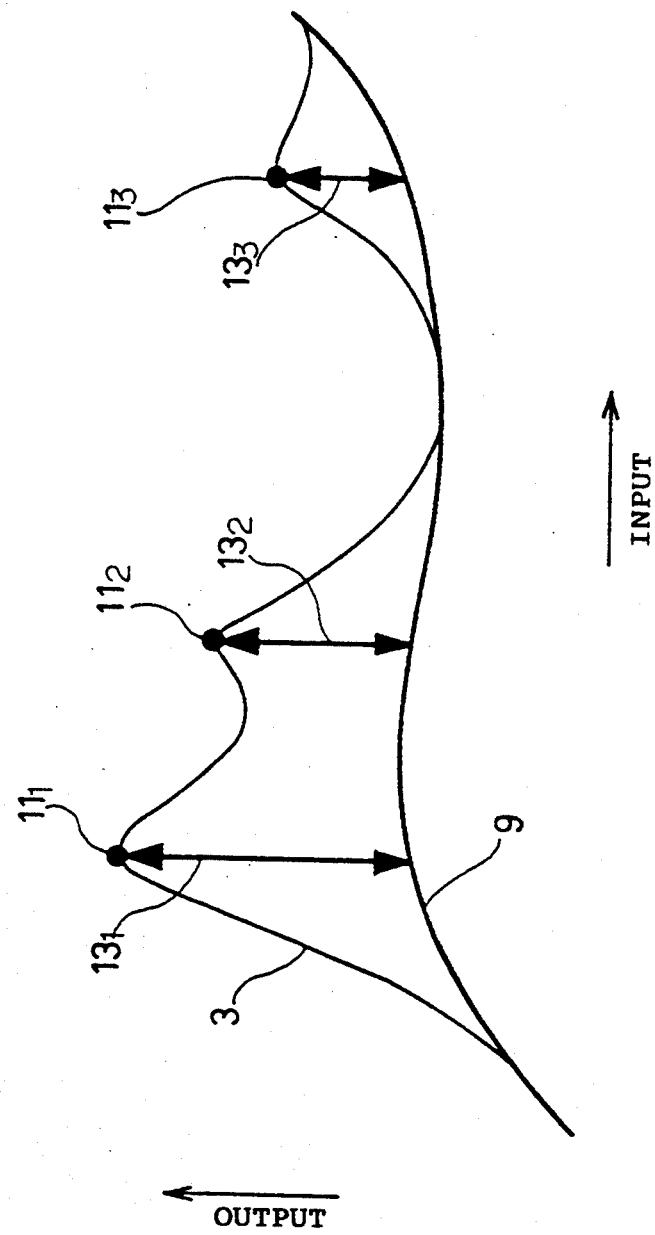
FIG. 16 is a first view showing the evaluation of sample data when the data selector portion of the present invention is applied to an applied input and output apparatus.

The adder 8 adds the main output 9 and the corrected output 12 from the Corrective input/output portion 6 and outputs the output 3. As shown in FIG. 16, the output of the adder 3 is when the corrected output 12 due to the sample data 11 selected by the data selecting and holding portion 7 is added to the main output 9. In this manner, the addition of the main output 9 and the corrected output 12 causes the added output 4 to be suitably output from the main output 9.

The adder 8 obtains the output $f(x_i; c_1, c_2, c_4)$ when the data $c_i$ which is the output $f(x_i)$ which is the sum of the corrected output of the corrective input/output portion 6 and the output from the main input/output portion 4. It is necessary to have neural network learning in order to do this. However, performing learning which is different for each learning data of the neural network is not practical from the point of view of the processing cost. Accordingly, there is the use of the squared error "$e_i^2$" which is generated by noting the change of the corrected output e(x) when there is the ignoring of a data "$c_i$" for which neural network learning is avoided as follows $$e_i^2 = |e_i - e(x_i, P_1, P_2, \ldots, P_{i-1}, P_{i+1}, \ldots, P_M)|^2$$

When the squared error "$e_i^2$" is used as the reference for evaluation, the sample data is more valid for the greater the value of the squared error "$e_i^2$".

The expression of the sample data 11 which is selected in the data selecting and holding portion 7 can be the relationship ($x_i$, $y_i$) between the input 2 and the output 3 in the same manner as for the sample data 10 of the data holding portion 5, but the expression of the sample data 11 can be the relationship between the output "$y_i$" of the input 2 ($x_i$), the main output 9 ($f_N(x_i)$), the output 3 "$y_i$" of the sample data 10 and the difference $e_i = y_i - f_M(x_i)$. In the case of the input 2 ($x_i$), the main output 9 ($f_N(x_i)$), the output "$y_i$" of the sample data 10 and the difference "$e_i$", the amount of calculation to obtain the output 3 ($y_i$) from the input 2 ($x_i$) is small and so it is possible to have a faster response. In addition, the amount of calculation when the selection of the data is performed is small in the case of the relationship ($x_i$, $y_i$) between the input 2 and the output 3.

FIG. 17 shows the case for the present invention when the sample data is evaluated using the error. When the error "e" is used, "$e_i$" which is the difference between the output $y_i$ and the main output 9 ($f_N(x)$) of the selected sample data is used and the sample data ($x_i$, $y_i$) having a large error 13 ($e_i$) is selected.

Furthermore, other methods of selecting the sample data include the method using the second embodiment of the data selector portion 120 shown in FIG. 7 here, when the sample data 14 is ignored without changing the main output 9 ($f_N(x)$), the output 15 and the output 3 which is not ignored are compared and difference amount 16 of the output in the sample data 14 and the integration value 17 over a suitable range and with respect to the input space of the difference amount 16 of the output can be used.

The response time for the corrective input/output portion 6 is short and so this is efficient when there is a comparison for only the output change of the corrective input 12 when certain sample data ($x_i$, $y_i$) is ignored but the output change due to the use of the main output 9 can be considered.

Furthermore, when the sample data 10 is selected, the data selecting and holding portion 7 in FIG. 15 keeps records of selected the sample data selected according to a selecting rule during a predetermined time. A past history such as the time average of the reference for selection as shown by the following equation, can be included in the selection standard of the sample data.

$$E(t) = \alpha E(t) + (1-\alpha) E(t-1) \cdot (0 < \alpha < 1)$$

Futhermore, it is possible to improve the characteristics of the output 3 in accordance with the object.

In addition, after sufficient application of the main input/output portion 4, it is possible to perform interpolation on the basis of many sample data and so the interpolation performance of the output 3 improves along with the progress of the application of the main input/output portion 4.

As has been described above, the present invention removes unnecessary sample data or uses a predetermined condition to remove sample data having a small evaluation quantity and validity when the input/output function is determined, extracts sample data having a high validity and determines an input/output function. Accordingly, sample data having a small evaluation quantity are removed and so the quantity of sample data used is reduced so that the learning of the neural network becomes faster.

In addition, with the present invention, sample data which have been judged invalid, can be again supplied for later data selection when judged necessary. Furthermore, sample data which has been held for a certain time are later removed after they have been held for a predetermined period and so it is possible to hold down the amount of memory used to hold the sample data.

When a data selector mechanism and a data holding mechanism having the constitution of the present invention are used in an applied input and output apparatus, it is possible to have a prompt output response with respect to the input, and at the same time for the speed of response of the main input/output portion to be covered by adding a corrected output of a corrective input/output portion and therefore reduce the predetermined time for response of the output. In particular, it is possible to apply successively new sample data and to enable the predetermined time for response to be greatly reduced by the generation of corrected output.

Furthermore, it is possible to expect an excellent interpolation performance if an adder is used after the present invention is used in a main input/output portion of an adaptive input/output portion, thereby making it possible to improve the interpolation performance of the output along with the progress of application of the main input and output apparatus.

The present invention is not limited to the above described embodiment, and variation may be made without departing from the scope of the invention.

What is claimed is:

1. An adaptive input-output apparatus, comprising;
    data holding means for holding sample data for determination of an input/output function;
    a data selector means for selecting said sample data from said data holding means, and selecting valid sample data from said sample data according to a predetermined evaluation standard for removing unnecessary sample data or low validity sample data from said sample data, wherein said data selector means includes: a data selecting/holding portion selecting valid sample data and holding selected data;
    input/output means for inputting external input data, determining an input/output function so that said input/output function approximates to a truth function in accordance with sample data selected by said data selector means, and outputting according to external output data said input/output function corresponding to said external input data, wherein said input/output means uses a neural network which uses sample data selected by said data selector means to determine said input/output function;
    a corrective input/output portion correcting a change amount between an output of arbitrary sample data and an output of an input/output function when said sample data is ignored; and
an adder adding an output from said input/output portion and said corrected output from said corrective input/output portion.

2. The adaptive input-output apparatus as claimed in claim 1, wherein
said data selector means selects valid sample data, which has large error between an output of said sample data and an output of said neural network as said predetermined evaluation standard in accordance with a predetermined rule.

3. The adaptive input-output apparatus as claimed in claim 1, wherein
said data selector means selects valid sample data, which has a large difference amount between an output of said sample data and an output of said input/output function when said sample data is ignored, in accordance with a predetermined rule, as said predetermined evaluation standard.

4. The adaptive input-output apparatus as claimed in claim 3, wherein
said data selector means integrates said difference amount over a predetermined range and selects sample data having a large integration value as valid sample data in accordance with a predetermined rule.

5. The adaptive input-output apparatus as claimed in claim 1, wherein said data selector means calculates at least one difference value or input value of said sample data, or the output values of said sample data, selects sample data having a small or a large difference value as valid sample data in accordance with a predetermined rule as said predetermined evaluation standard.

6. The adaptive input-output apparatus as claimed in claim 5, wherein
said difference value is a distance.

7. The adaptive input-output apparatus as claimed in claim 6, wherein
said distance is a Euclidean distance.

8. The adaptive input-output apparatus as claimed in claim 1, wherein
said data selector means uses an evaluation quantity calculated using an error between an output of said input/output function and an output of said sample data as said predetermined evaluation standard, or a difference value between an output value of arbitrary sample data and an output of an input/output function when that sample data is ignored, or determines an evaluation record which is kept with said selected sample data according to said predetermined rule during a predetermined time, with respect to said sample data and using said difference value, and in accordance with a predetermined rule, selects valid data as sample data having a large or a small value of said evaluation records.

9. The adaptive input-output apparatus as claimed in claim 1, wherein
said data holding means includes an active data holding portion which holds sample data determined by said data selector means as being valid sample data, and a sleep data holding portion which temporarily holds sample data which has been determined by an active data holding portion as being relatively invalid, and which in accordance with necessity, returns sample data inside said sleep data holding portion to said active data holding portion.

10. The adaptive input-output apparatus as claimed in claim 9, wherein
said data holding means removes data having either a low evaluation quantity and/or for which a predetermined time has elapsed from sample data held in said sleep data holding portion.

11. The adaptive input-output apparatus as claimed in claim 1, further provided with a data selecting/holding portion for selecting valid sample data and holding selected data;
a corrective input/output portion for correcting a change amount between an output of arbitrary sample data and an output of an input/output function when said sample data is ignored; and
an adder for adding an output from said input/output portion and said corrected output from said corrective input/output portion.

12. The adaptive input-output apparatus as claimed in claim 1, wherein
said corrective input/output portion uses K-readjacent method.

* * * * *

UNITED STATES PATENT AND TRADEMARK OFFICE
CERTIFICATE OF CORRECTION

PATENT NO. : 5,420,810

DATED : May 30, 1995

INVENTOR(S) : Yamakawa et al.

It is certified that error appears in the above-identified patent and that said Letters Patent is hereby corrected as shown below:

Col. 4, line 51, "$(x_i 1, y_i)$" should be --$(x_i, y_i)$--.

Signed and Sealed this

Twenty-second Day of August, 1995

Attest:

BRUCE LEHMAN

*Attesting Officer*   *Commissioner of Patents and Trademarks*